Aug. 29, 1950
W. G. MARTIN ET AL
2,520,771
DIAPHRAGM VALVE
Filed Jan. 22, 1949
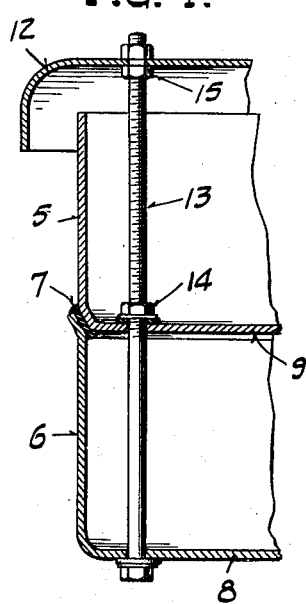
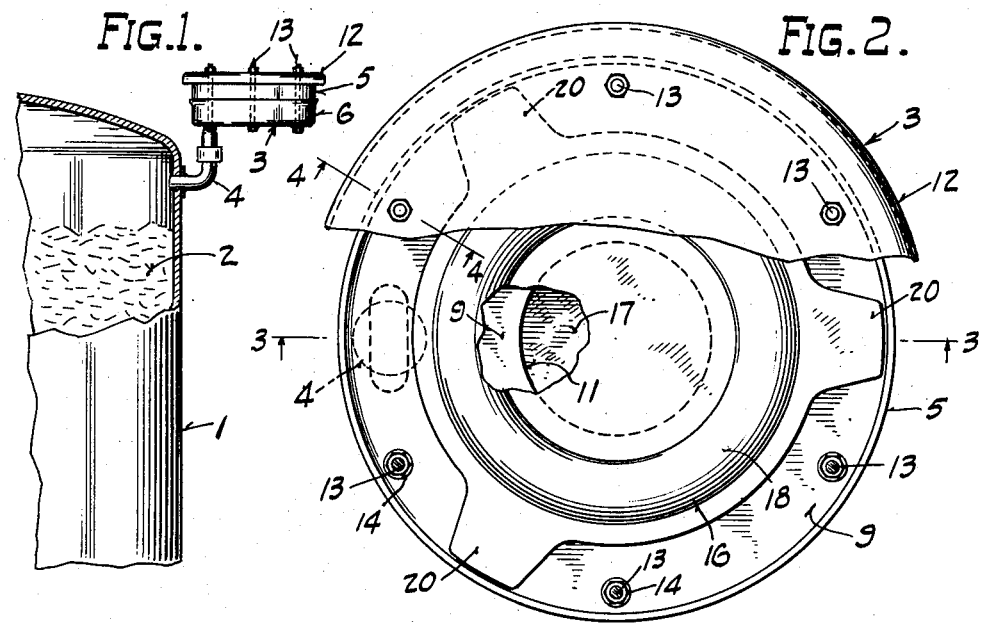
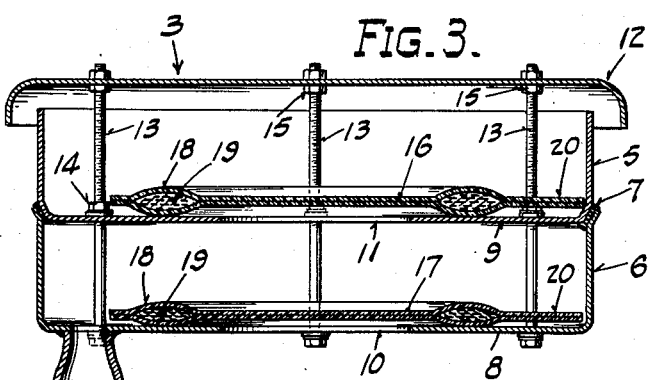
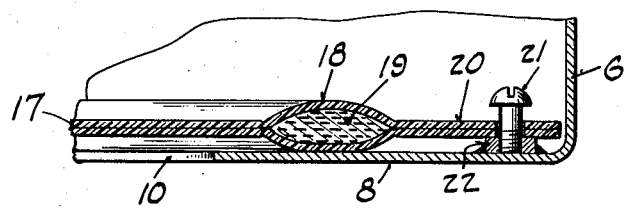
INVENTORS:
Wesley G. Martin
Arthur E. Raeuber Jr.
BY Andrus & Sceales
ATTORNEYS.

Patented Aug. 29, 1950

2,520,771

UNITED STATES PATENT OFFICE 2,520,771

DIAPHRAGM VALVE

Wesley G. Martin and Arthur E. Raeuber, Jr., Milwaukee, Wis., assignors to A. O. Smith Corporation, Milwaukee, Wis., a corporation of New York Application January 22, 1949, Serial No. 72,116

8 Claims. (Cl. 137—53)

This invention relates to a valve and particularly has reference to a valve with a flexible diaphragm having a filled hollow annulus on the periphery thereof effecting sealing engagement of the valve with its seat.

One object of the invention is to provide a flexible diaphragm valve which tightly seals the valve opening due to the weight of the valve and flexibility in aligning itself on its seat around the valve opening.

Another object is to provide a valve which may be set to operate at very low pressure differentials between two separated volumes of gases and which will permit small or large volumes of gases to flow without increases in the set operating pressures of the valve.

A further object is to provide a valve which will operate under all types of weather conditions without sticking or freezing.

Another object is to provide a valve which controls the pressures of a separated volume of gas within predetermined limits above and below atmospheric by provision for control of flow of gases through the valve in either direction.

A further object is to provide a valve which drops in pressure in the valve chamber upon increase in the volume of gases bled through the valve.

Another object is to provide a valve wherein the weight of the filling material in the diaphragm of the valve determines the pressure at which leakage of gases through the valve begins.

These and other objects of the invention will appear hereinafter in connection with the following description of several embodiments of the invention as illustrated in the accompanying drawing.

In the drawing:

Figure 1 is an elevational view of the valve of the invention showing connection to a structure and with parts broken away and sectioned;

Fig. 2 is a top plan view of the valve structure with parts broken away;

Fig. 3 is a section taken on line 3—3 of Fig. 2;

Fig. 4 is an enlarged detailed section showing the bolting of the valve parts; and Fig. 5 is a detail section illustrating a way to hold the diaphragm portion of the valve in place.

The drawing illustrates a structure 1 within which is stored a product 2 that tends to give off gases during storage. These gases tend to expand and contract with temperature and barometric changes so that the structure is said to breathe under operating conditions. In the storage of the product 2 it is desirable to retain in the structure if possible the gases given off thereby and also to keep out the surrounding air.

However, when the gases tend to expand, provision must be made to allow the gases to blow off from inside the structure after certain predetermined pressures are reached or the structure may fail. Likewise, provision must be made for flow of air gases into the structure upon contraction of the gases therein to a predetermined negative pressure, otherwise the structure may collapse.

The invention provides the valve 3 which is connected to structure 1 by the pipe 4 to operate as the control device for regulating the egress of gases from the structure and ingress of air.

Valve 3 as far as the body portion is concerned may be constructed in a number of different ways. The valve 3 shown in the drawing is formed of an upper cylindrical shell 5 which seats within a lower cylindrical shell 6. The lower shell is flared at the upper end to provide a seat to receive the upper shell and the gasket 7 is interposed between the two shells at their overlapping portions to seal the joint therebetween.

Lower shell 6 has a bottom wall 8 and shell 5 has a bottom wall 9. A central circular opening 10 is provided in wall 8 of shell 6 in axial alignment with a similar opening 11 provided in wall 9 of upper shell 5.

The cover 12 of substantially greater diameter than the shells overhangs upper shell 5. The shells 5 and 6 and cover 12 are bolted together by a plurality of circumferentially spaced bolts 13 which extend upwardly through the same. The intermediate nuts 14 when tightened secure the shells together and the nuts 15 on the inside of cover 12 space the cover from the upper end of the upper shell 5.

Central opening 11 of wall 9 of shell 5 is closed by the flexible diaphragm or disc 16, and opening 10 of wall 8 of the lower shell member is closed by a similar flexible diaphragm or disc 17. Each diaphragm 16 and 17 has a hollow annulus 18 on the periphery thereof which is filled with a material such as mercury 19, and seats on the respective wall 8 or 9.

The diaphragms are constructed of a material which will stand up in hot and cold weather and under dry and humid conditions. The material must also be of a type which will not stick to the metal shells in freezing weather. The material must also be capable of confining liquid in the annulus 18 thereof. Experiments have indicated that a vinyl plastic material has the desirable characteristics mentioned. Other suitable material is synthetic or natural rubber treated to decrease any tendency to stick to the seat upon which the diaphragm rests. Silicon plastic material also has the characteristics required in the diaphragms of the invention.

The specific shape and size of each diaphragm may be different in different uses of the valve and the manner of confining the diaphragms may be varied. As illustrated in Figs. 2 and 3, the diaphragms are formed with a plurality of tabs 20 which project between bolts 13 and extend to the vertical wall of the shells to limit radial movement of the diaphragms. In this illustration the diaphragms are free to float up and down.

Fig. 5 illustrates an embodiment of the invention wherein screws 21 extend through the tabs 20 and are threaded into a nut 22 secured to the wall of the shell. The head of the screw is spaced from the diaphragm to permit limited vertical movement, and the hole in the diaphragm through which the screw passes is of greater diameter than the screw to permit slight radial movement of the diaphragm.

As stated above, mercury has been found very suitable to confine in annulus 18 of the diaphragms as the mercury is heavy enough to hold the diaphragm on its seat against a predetermined pressure without the use of additional weights and also is of a flexibility to flatten the annulus 18 of the diaphragms against the wall on which it seats even though foreign material such as ice, for example, may form partially over the seat to make it irregular. The amount of pressure that the valve is required to hold determines the amount of mercury which is inserted into annulus 18.

The diaphragms 16 and 17 and annulus 18 are formed by sealing together along two concentric lines two sheets of the material employed. The mercury is inserted through a special valve opening, not shown, or through a hole in the annulus 18 which later may be sealed off.

Although mercury has been found to be the most likely element to be employed as the filler for annulus 18, experiments have indicated that other materials will serve in a similar fashion. The selection of materials is limited since the material employed should, for the best operations, withstand freezing temperatures and be of a weight so that the quantity required is small to provide a valve which is compact. For example, in certain applications of the valve a glycerine solution and a magnesium chloride solution has been found feasible. Also powdered or fine materials such as iron shot, steel grit, aluminum oxide or sand may be used.

In the valve 3 shown, the upper diaphragm 16 controls the flow of gases from structure 1 while the lower diaphragm 17 controls the flow of air into structure 1. The annulus 18 of diaphragm 16 is larger than that of the lower diaphragm 17 to hold more mercury 19 and give the upper diaphragm 16 greater weight. This construction thus illustrates use of the valve with a structure in which greater positive pressures of the gases tending to expand are permitted compared to the negative pressures permitted upon tendency of the gases therein to contract. Other ways of constructing the diaphragms to provide them of different weights may be employed. For example, a different solution may be used in each diaphragm or less of the filler material may be used in the annulus of one diaphragm than the annulus of the other diaphragm or there may be a difference in size of the diaphragms.

In operation of the valve, where pressure drops within structure 1 due to a drop in temperature, for example, to the point at which lower diaphragm 17 is set to open, the air on the outside of the structure tending to flow into the structure through opening 10 lifts diaphragm 17 from its seat on wall 8. The diaphragm rises within shell 6 to provide a passage between itself and wall 8 for air to flow into shell 6 and thence through pipe 4 to structure 1.

Similarly, gases expanding or generated within structure 1 flow through pipe 4 into shell 6 and out of the valve by lifting upper diaphragm 16 off from its seat on wall 9.

When diaphragms 16 and 17 open, they tend to obtain a fluttering action in floating on the gases flowing through the valve but assume a position providing sufficient clearance between each diaphragm and its respective seat to handle the required flow of gases to take care of the pressure condition inside the structure.

One feature of the valve is that with an increase in pressure inside structure 1 due to the temperature rising, barometric changes or generation of gases therein, the pressure in the valve decreases with a consequent release of large amounts of gas and a relatively fast drop of the pressure inside the structure.

Thus, for example, if the valve is set to open at one and one-half inches of pressure and the pressure in the structure is one and one-half inches, there will be a slight leakage through the valve. If the pressure in the structure rises to two inches, then the pressure in the valve will drop to about one inch and the gases causing the increase of pressure will be quickly blown off.

The invention has numerous advantages for protecting a structure in which pressure conditions inside the structure change due to barometric or temperature changes, or generation of gases in the structure or removal of the product stored therein. The weight and flexibility of the filler material, particularly in the case of mercury, seals the diaphragms to their respective seats to provide a substantially perfect seal. The diaphragms do not stick to their seats in freezing weather to insure that the structure is fully protected against failure. The valve is extremely sensitive in that it operates with low pressure differentials and provides substantially perfect seals within its pre-set range of pressures. The particular valve body shown and the connection thereof to the structure is merely illustrative as the invention does not require the particular construction shown.

Various embodiments of the invention may be employed within the scope of the accompanying claims.

We claim:

1. In a valve connected to a structure and set for a predetermined pressure providing a control of the pressures within the structure, an opening through a wall of said valve for flow of gases therethrough, a diaphragm extending across said opening to close the same with a hollow annulus extending circumferentially of the diaphragm and seating on the wall of the valve, and a material confined in said annulus of a weight sufficient to seal the diaphragm to its seat against the predetermined pressure within said valve but permitting the diaphragm to be lifted from its seat when the predetermined pressure within the valve is exceeded due to pressure conditions within said structure and gases tend to flow through said opening.

2. In a valve connected to a structure and set for a predetermined pressure providing a control of the pressures within the structure, an opening through a wall of said valve for flow of gases therethrough, a flexible diaphragm extending across said opening to close the same with a hollow annulus extending circumferentially of the diaphragm and seating on the wall of the valve, and a pliable material confined in said annulus of a weight sufficient to seal the diaphragm to its seat against the predetermined pressure within said valve but permitting the diaphragm to be lifted when the predetermined pressure within the valve is exceeded and gases tend to flow through said opening, and the flexibility of the diaphragm and pliability of the said material effecting seating of the annulus of the diaphragm over an irregular surface.

3. In a valve connected to a structure and set for a predetermined pressure providing a control of the pressures within the structure, an opening through a wall of said valve for flow of gases therethrough, a diaphragm extending across said opening to close the same with a hollow annulus extending circumferentially of the diaphragm and seating on the wall of the valve, and mercury confined in said annulus in a quantity sufficient to seal the diaphragm to its seat against the predetermined pressure within said valve but permitting the diaphragm to be lifted from its seat when the predetermined pressure within the valve is exceeded due to pressure conditions within said structure and gases tend to flow through said opening.

4. In a valve connected to a structure and set for a predetermined pressure providing a control of the pressures within the structure, an opening through a wall of said valve for flow of gases therethrough, a diaphragm extending across said opening to close the same with a hollow annulus extending circumferentially of the diaphragm and seating on the wall of the valve, and glycerine solution confined in said annulus in a quantity sufficient to seal the diaphragm to its seat against the predetermined pressure within said valve but permitting the diaphragm to be lifted from its seat when the predetermined pressure within the valve is exceeded due to pressure conditions within said structure and gases tend to flow through said opening.

5. In a valve connected to a structure and set for a predetermined pressure providing a control of the pressures within the structure, an opening through a wall of said valve for flow of gases therethrough, a diaphragm extending across said opening to close the same with a hollow annulus extending circumferentially of the diaphragm and seating on the wall of the valve, and powdered materials confined in said annulus in a quantity sufficient to seal the diaphragm to its seat against the predetermined pressure within said valve but permitting the diaphragm to be lifted from its seat when the predetermined pressure within the valve is exceeded due to pressure conditions within said structure and gases tend to flow through said opening.

6. In a valve connected to a structure and set for a predetermined pressure providing a control of the pressures within the structure, a pair of walls in said valve axially spaced from one another and defining a chamber therebetween opening into said structure, an opening in one of said walls for flow of gases through said opening into said chamber and structure, and an opening in the other of said walls for flow of gases out of said chamber and structure, a flexible diaphragm extending across each of said openings to close the same with a hollow annulus extending circumferentially of each diaphragm and seating on the respective walls of the valve, and a pliable material confined in each annulus of a weight sufficient to seal each respective diaphragm to its seat but permitting the one diaphragm to be lifted from its seat for egress of gases from said structure when the predetermined pressures within the valve are exceeded due to expansion of gases inside said structure and the other of said diaphragms to be lifted from its seat for ingress of gases to said structure when the predetermined pressures within the valve are exceeded due to contraction of gases inside said structure.

7. In a valve connected to a structure and set for a predetermined pressure providing a control of the pressures within the structure, a pair of walls in said valve spaced from one another and defining a chamber therebetween opening into said structure, an opening in one of said walls for flow of gases through said opening into said chamber and structure and an opening in the other of said walls for flow of gases out of said chamber and structure, a flexible diaphragm extending across each of said openings to close the same with a hollow annulus extending circumferentially of each diaphragm and seating on the respective walls of the valve, and mercury confined in each annulus of a weight sufficient to seal each respective diaphragm to its seat but permitting the one diaphragm to be lifted from its seat for egress of gases from said structure when the predetermined pressures within the valve are exceeded due to expansion of gases inside said structure and the other of said diaphragms to be lifted from its seat for ingress of gases to said structure when the predetermined pressures within the valve are exceeded due to contraction of gases inside said structure.

8. In a valve connected to a structure and set for a predetermined pressure providing a control of the pressures within the structure, a pair of walls in said valve spaced from one another and defining a chamber therebetween opening into said structure, an opening in one of said walls for flow of gases through said opening into said chamber and structure, and an opening in the other of said walls for flow of gases out of said chamber and structure, a flexible diaphragm extending across each of said openings to close the same with a hollow annulus extending circumferentially of each diaphragm and seating on the respective walls of the valve, a pliable material confined in each annulus of a weight sufficient to seal each respective diaphragm to its seat but permitting the one diaphragm to be lifted from its seat for egress of gases from said structure when the predetermined pressures within the valve are exceeded due to expansion of gases inside said structure and the other of said diaphragms to be lifted from its seat for ingress of gases to said structure when the predetermined pressures within the valve are exceeded due to contraction of gases inside said structure, and means to guide the upward movement of said diaphragms and prevent radial displacement of the same.

WESLEY G. MARTIN.
ARTHUR E. RAEUBER, JR.

REFERENCES CITED

The following references are of record in the file of this patent:

UNITED STATES PATENTS

| Number | Name | Date |
|---|---|---|
| 35,146 | Edson | May 6, 1862 |
| 129,138 | Jewell | July 16, 1872 |
| 1,915,661 | Gibson | June 27, 1933 |
| 2,317,923 | Lebo | Apr. 27, 1943 |